(12) United States Patent
Billet et al.

(10) Patent No.: US 8,150,030 B2
(45) Date of Patent: Apr. 3, 2012

(54) CRYPTOGRAPHIC HASHING DEVICE AND METHOD

(75) Inventors: Olivier Billet, Tourrettes sur Loup (FR); Henri Gilbert, Bures sur Yvette (FR); Matt Robshaw, Paris (FR)

(73) Assignee: France Telecom, Paris (FR)

( * ) Notice: Subject to any disclaimer, the term of this patent is extended or adjusted under 35 U.S.C. 154(b) by 745 days.

(21) Appl. No.: 12/280,652

(22) PCT Filed: Feb. 22, 2007

(86) PCT No.: PCT/FR2007/050836
§ 371 (c)(1),
(2), (4) Date: Aug. 25, 2008

(87) PCT Pub. No.: WO2007/096566
PCT Pub. Date: Aug. 30, 2007

(65) Prior Publication Data
US 2009/0067620 A1    Mar. 12, 2009

(30) Foreign Application Priority Data
Feb. 23, 2006   (FR) ..................................... 06 50619

(51) Int. Cl.
*G06F 21/00* (2006.01)
(52) U.S. Cl. .......................................... 380/28; 713/181
(58) Field of Classification Search ........................ None
See application file for complete search history.

(56) References Cited

U.S. PATENT DOCUMENTS

| 5,263,085 A * | 11/1993 | Shamir ........................... 380/30 |
| 6,031,464 A * | 2/2000 | Matsumoto et al. ......... 340/5.86 |
| 6,269,098 B1 | 7/2001 | Crayford |
| 2002/0095581 A1* | 7/2002 | Imai et al. ..................... 713/180 |
| 2005/0271203 A1* | 12/2005 | Akiyama et al. ................ 380/30 |

OTHER PUBLICATIONS

M.H. Jakubowski et al., "The chain and sum primitive and its applications to MAC's and stream ciphers", Advances in Cryptology, Eurocrypt, pp. 281-293, Jun. 4, 1998.
B. Sunar et al., "Comparison of Bit and Word Level Algorithms for Evaluating Unstructured Functions over Finite Rings", Cryptographic Hardware and Embedded Systems, Ches 2005, 7$^{th}$ International Workshop Proceedings (Lecture Notes in Computer Science vol. 3659), pp. 237-249, 2005.

(Continued)

*Primary Examiner* — Gilberto Barron, Jr.
*Assistant Examiner* — Shaun Gregory
(74) *Attorney, Agent, or Firm* — Cozen O'Connor

(57) ABSTRACT

A device and a method of cryptographically hashing a message M, including the following steps: forming a sequence (M1, ..., Mi, ..., Mc) of data m-tuples $M1=(a_{1,1}, \ldots, a_{1,m}), \ldots Mi=(a_{i,1}, \ldots, a_{i,m}), \ldots, Mc=(a_{c,1}, \ldots, a_{c,m})$, where m is a strictly positive integer, from said message M; iteratively calculating successive output p-tuples $V_1, \ldots, V_i, \ldots, V_c$, where p is a strictly positive integer, corresponding to said sequence (M1, ..., Mi, ..., Mc) of data m-tuples as a function of at least one set of multivariate polynomials defined over a finite field; and determining a hashing value of said message M as a function of the last output p-tuple $V_c$.

9 Claims, 5 Drawing Sheets

OTHER PUBLICATIONS

V. Shoup, "International Association for Cryptologic Research: On Fast and Provably Secure Message Authentication Based on Universal Hashing", Advances in Cryptology—Crypto '96, 16$^{th}$ Annual International Cryptology Conference, vol. 16, pp. 313-328, Aug. 18, 1996.

Merkle, R.C., "One Way Hash Functions and DES", CRYPTO, Springer-Verlag, pp. 428-446, 1989.

Wang, X. et al., "Finding Collisions in the Full SHA-1", Aug. 2005 (20 pages).

Wang, X. et al., "How to Break MD5 and Other Hash Functions", May 2005 (17 pages).

Wang, X. et al., "Finding Collisions in the Full SHA-1", R. Cramer, Editor, Advances in Cryptology, Proceedings Eurocrypt'05, LNCS 3494, Springer-Verlag (2005), Aug. 2005, pp. 19-35.

Wang, X. et al., "How to Break MD5 and Other Hash Functions", V. Shoup, Editor, Advances in Cryptology, Proceedings Crypto'05, LNCS 3621, Springer-Verlag May 2005 pp. 17-36.

* cited by examiner

CRYPTOGRAPHIC HASHING DEVICE AND METHOD

RELATED APPLICATIONS

This is a U.S. National Phase Application under 35 USC 371 of International Application PCT/FR2007/050836, filed on Feb. 22, 2007.

This application claims the priority of French application No. 06/50619 filed on Feb. 23, 2006, and the content of which is hereby incorporated by reference.

TECHNICAL FIELD OF THE INVENTION

The invention relates to cryptography. To be more precise, the invention concerns the use of a cryptographic condensation function, also known as a "compression" function or a "hashing" function.

BACKGROUND OF THE INVENTION

Hashing functions (or hash functions) are widely used in cryptography because they can reduce the length of a digital data word, for example to reproduce an electronic signature or certificate to guarantee the integrity and authenticity of a message. Hashing functions can also form essential parts of a wide range of protocols, such as cryptographic entity authentication protocols or the SSL/TLS protocol.

As a general rule, a hashing function H is a compression function that converts a large set of characters (referred to as the message or input) of any length into a smaller set of characters of fixed length (called the output, message digest or hash). Because the hashing function is a "one way" function it is impossible to retrieve the original set from the message digest.

One example of this kind of hashing function is described by R. C. Merkle in the paper "One-way Hash Functions and DES" (CRYPTO, Springer-Verlag 1989), where the message digest is calculated by a chaining principle.

To be more precise, a function is a cryptographic hashing function if it satisfies the following three conditions: resistance to attacks "on the first pre-image" (or antecedent), resistance to attacks "on the second pre-image", and resistance to "collisions".

Resistance to an attack on the first pre-image makes it very difficult (i.e. technically virtually impossible) to recover the content of a message or input x from a given message digest or output y. In other words, it is technically virtually impossible (either at the algorithm level or the hardware level) to find an input x such that $H(x)=y$.

Resistance to an attack on the second pre-image makes it very difficult to produce from a message x and its message digest y another message x' that gives the same message digest y. In other words, given an input-output pair (x, y) where $H(x)=y$, it is very difficult to find an input x' where $x' \neq x$ such that $H(x')=y$.

Resistance to collisions makes it very difficult to find two random messages that give the same message digest. In other words, it is very difficult to find any two inputs x and x' such that $H(x)=H(x')$.

For example, for a message digest having a length of n bits, there are $2^n$ such message digests. Moreover, the "birthdays" theorem indicates that $2^{n/2}$ attempts are sufficient to find a collision by chance.

Thus a cryptographic hashing function is of good quality if the minimum number of attempts necessary to solve the above three problems is of the order of $2^n$, $2^n$ and $2^{n/2}$, respectively.

At present, the hashing functions in widespread use are constructed on a one-off basis or are based on using DES (data encryption standard) block encryption. However, their performance and their message digest lengths are not well suited to current uses in cryptography.

The hashing functions most widely used at present are of the MD5 (Message Digest Algorithm) type and the SHA-1 (Secure Hash Standard) type (see http://www.ietf.org/rfc/rfc3174.txt).

However, X. Wang and H. Yu have shown, in their papers "How to Break MD5 and Other Hash Functions" (May 2005) and "Finding Collisions in the Full SHA-1" (August 2005), that these functions have weaknesses enabling faster calculation of collisions than pure chance. Similarly, other types of hashing functions that are also part of the MD5 family are also vulnerable.

Attempts have been made to construct other hashing functions relying, through certain proofs, on the difficulty of solving certain classes of problems in the arithmetic of large numbers. The major drawback of these functions is the lack of efficiency inherent to the arithmetic of large numbers. Moreover, they guarantee resistance only to collisions and therefore do not satisfy the conditions regarding resistance to attacks on the first pre-image and the second pre-image.

OBJECT AND SUMMARY OF THE INVENTION

One aspect of the present invention relates to a method of cryptographically hashing a message M, including the following steps:

forming a sequence (M1, ..., Mi, ..., Mc) of data m-tuples, where m is a strictly positive integer, from said message M;

iteratively calculating successive output p-tuples $V_1, \ldots, V_i, \ldots, V_c$, where p is a strictly positive integer, corresponding to said sequence of data m-tuples as a function of at least one set of multivariate polynomials defined over a finite field; and determining a hashing value of said message M as a function of the last output p-tuple $V_c$.

Evaluating systems of polynomials over a finite field is extremely fast, especially for polynomials of low degree (for example of degree 2, 3, or 4), whereas it is very difficult to invert a polynomial evaluation in reasonable time. This is because finding an antecedent of a value taken by a set of polynomials is known to be a very difficult mathematical problem.

Thus new security properties are easily accessed, which is difficult in the prior art, which uses hashing functions that are all constructed on the same principle and suffer many attacks.

The iterative calculation of the successive output p-tuples $V_1, \ldots V_i, \ldots, V_c$ includes the following steps:

defining an initialization input p-tuple $E_0=(e_{01}, \ldots, e_{0p})$ in the finite field;

applying said initialization input p-tuple $E_0$ and a first data m-tuple M1 to said at least one set of multivariate polynomials to calculate a first output p-tuple $V_1$ corresponding to said first data m-tuple M1; and each new current iteration i includes the following steps:

defining a current input p-tuple $E_i=(e_{i1}, \ldots, e_{ip})$ in the finite field that is a function at least of one of the output p-tuples $V_1, \ldots, V_{i-1}$ calculated in the preceding iterations; and applying said current input p-tuple $E_i$ and a current data m-tuple Mi to said at least one set of multivariate polynomials to calculate a current output p-tuple $V_i$ corresponding to the current data m-tuple Mi.

Thus the method is simple to use and provides a high level of security.

The current input p-tuple $E_i=(e_{i1}, \ldots, e_{ip})$ advantageously corresponds to a chaining p-tuple defined as being equal to the preceding output p-tuple $V_{i-1}$ calculated in the preceding iteration.

Thus, for each data m-tuple Mi, the corresponding input p-tuple has already been calculated in the preceding iteration as a function of the preceding chaining p-tuple $V_{i-1}$ and the preceding data m-tuple, which further facilitates using the method and at the same time provides high security.

At least one set of multivariate polynomials can advantageously be modified in each iteration i as a function of said current input p-tuple $E_i=(e_{i1}, \ldots, e_{ip})$.

Thus inversion of a polynomial evaluation becomes even more complex, which increases security without unduly decreasing the efficiency and speed of calculation of the hashing value.

In one particular embodiment of the invention, the calculation of said output p-tuple $V_i$ corresponding to said data m-tuple Mi includes simultaneous application of said data m-tuple and the corresponding input p-tuple $E_i$ to only one set of multivariate polynomials, said set of multivariate polynomials being of compressive form.

A set of multivariate polynomials is said to be of compressive form when it includes a number of polynomials smaller than the number of variables associated with each polynomial.

Thus the hashing value is calculated with a high security level in an optimum time.

In another embodiment of the invention, the calculation of said output p-tuple $V_i$ corresponding to said data m-tuple Mi includes the following steps:
  calculating an intermediate data t-tuple by applying said data m-tuple Mi to a first set of multivariate polynomials;
  simultaneously applying said intermediate data t-tuple and the input p-tuple $E_i$ corresponding to said data m-tuple Mi to a second set of multivariate polynomials to determine said output p-tuple $V_i$.

This increases the level of security because it is even more difficult to recover the message from a hashing value determined by two chained sets of multivariate polynomials, even if those polynomials are of low degree, for example of degree 2.

In another embodiment of the invention, the calculation of said output p-tuple corresponding to said data m-tuple Mi includes the following steps:
  calculating an intermediate data t-tuple by simultaneously applying said data m-tuple and said corresponding input p-tuple $E_i$ to a first set of multivariate polynomials;
  applying said intermediate data t-tuple to a second set of multivariate polynomials to determine said output p-tuple $V_i$.

This other embodiment is of high security because it is very difficult to find the message using a hashing value determined by two chained sets of multivariate polynomials even if those polynomials are of low degree.

Said first set of multivariate polynomials is advantageously of expansive form and said second set of multivariate polynomials is advantageously of compressive form.

A set of multivariate polynomials is said to be of expansive form when that set includes a number of polynomials greater than the number of variables associated with each polynomial.

The expansive form of the first set of multivariate polynomials guarantees no collision during the first step and increases the resistance to collisions during the next compression step.

Another aspect of the present invention is directed to a device for cryptographically hashing a message M, and including:
  formation means for forming a sequence (M1, ..., Mi, ..., Mc) of data m-tuples $M1=(a_{1,1}, \ldots, a_{1,m}), \ldots Mi=(a_{i,1}, \ldots, a_{i,m}), \ldots, (Mc=a_{c,1}, \ldots, a_{c,m})$, where m is a strictly positive integer, from said message M;
  calculation means for iteratively calculating successive output p-tuples $V_1, \ldots, V_i, \ldots, V_c$, where p is a strictly positive integer, corresponding to said sequence (M1, ..., Mi, ..., Mc) of data m-tuples as a function of at least one set of multivariate polynomials defined over a finite field; and
  determination means for determining a hashing value of said message M as a function of the last output p-tuple $V_c$.

Said calculation means advantageously include:
  means for defining an initialization input p-tuple $E_0=(e_{01}, \ldots, e_{0p})$ in the finite field F;
  means for applying said initialization input p-tuple $E_0$ and a first data m-tuple M1 to said at least one set of multivariate polynomials to calculate a first output p-tuple $V_1$ corresponding to said first data m-tuple M1;
  means for defining, in each new current iteration i, a current input p-tuple $E_i=(e_{i1}, \ldots, e_{ip})$ in the finite field F that is a function at least of one of the output p-tuples $V_1, \ldots, V_{i-1}$ calculated in the preceding iterations; and
  means for applying said current input p-tuple $E_i$ and a current data m-tuple Mi to said at least one set of multivariate polynomials to calculate a current output p-tuple $V_i$ corresponding to said current data m-tuple Mi.

Another aspect of the invention is directed to a computer program downloadable from a communications network and/or stored on a computer-readable medium and/or executable by a microprocessor, comprising instructions for executing the steps of a cryptographic hashing method with one or more of the following features when it is executed in a computer.

BRIEF DESCRIPTION OF THE DRAWINGS

Other features and advantages of the invention emerge on reading the description given below by way of non-limiting illustration and with reference to the appended drawings, in which.

DETAILED DESCRIPTION OF EMBODIMENTS

Figure 1:
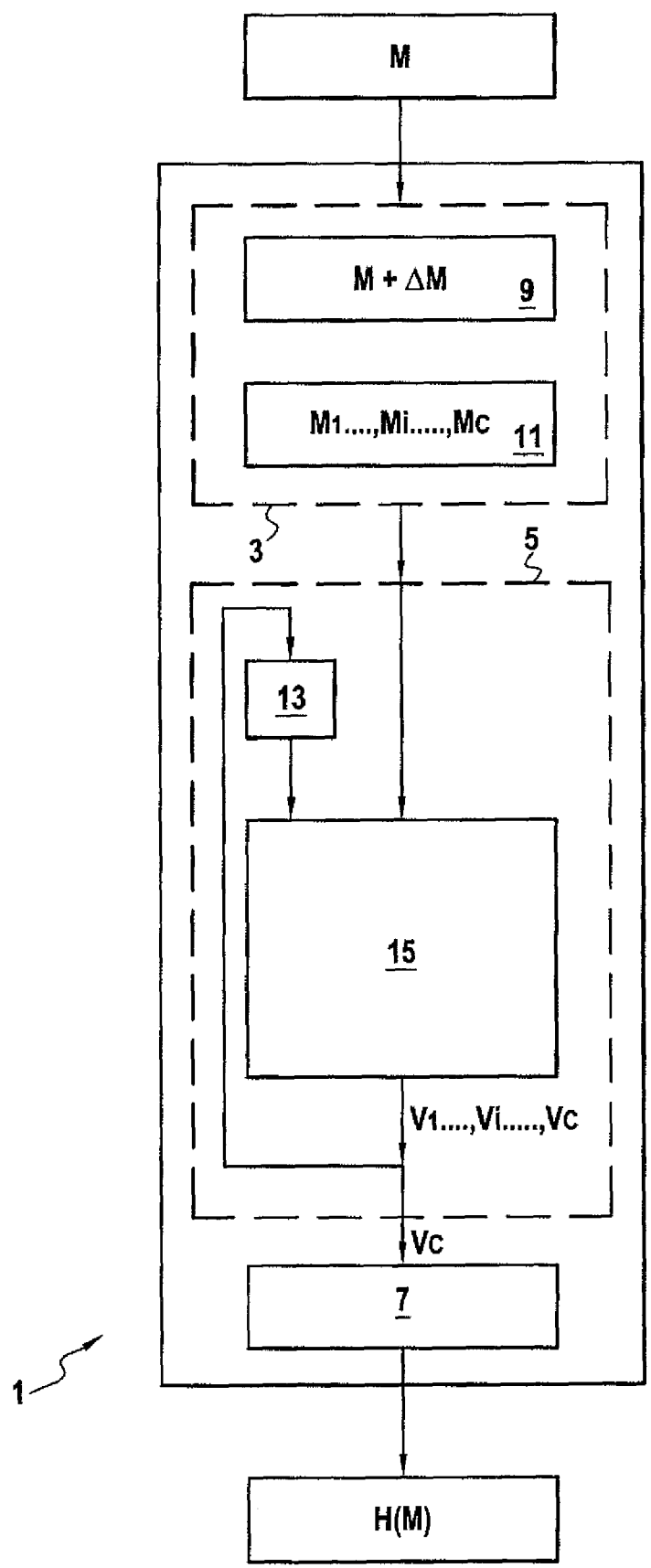
FIG. 1 is diagram of a device of the invention for cryptographically hashing a message.

FIG. 1 shows one example of a device 1 of the invention for cryptographically hashing a message, for example to encrypt or sign the message. The device 1 comprises formation means 3, calculation means 5, and determination means 7.

The formation means 3 are for forming a sequence M1, ..., Mi, ..., Mc of blocks or m-tuples of data from a message M. Thus the message M, which can be of any length, can be represented by a sequence of m-tuples $M1=(a_{1,1}, \ldots,$ $a_{1,m}$), ..., Mi=($a_{i,1}$, ..., $a_{i,m}$), ..., Mc=$a_{c,1}$, ..., $a_{c,m}$), where m is a strictly positive integer. The m-tuples are defined in a finite field F, for example the binary field GF(2).

This can typically be effected by securely adding or concatenating additional messages ΔM to/with the original message M to form a completed message M+ΔM the length of which is a multiple of that of a block Mi. In this example, the completed message M+ΔM has a length equal to c multiplied by m(|M+ΔM|=|cm|). Of course, it is sufficient but not necessary for the length of ΔM to be less than m. The additional elements ΔM can advantageously include information relating to the original message M, such as the initial length of that message M.

Thus the formation means 3 can include padding means 9 and subdivision means 11. The padding means 9 are for padding out the message M with the additional elements ΔM to complete its length so as to be able to subdivide it. The subdivision means 11 are adapted to subdivide the completed message M+ΔM to form the sequence of m-tuples M1, ..., Mi, ..., Mc.

The calculation means 5 calculate iteratively successive output p-tuples $V_1$, ..., $V_i$, ..., $V_c$, where p is a strictly positive integer, corresponding to the sequence (M1, ..., Mi, ..., Mc) of data m-tuples as a function of at least one set of multivariate polynomials Π of any degree defined over a finite field F.

Finally, the determination means 7 determine a hashing value H(M) of the message M as a function of the last output p-tuple $V_c$. Thus the hashing value H(M)=ϕ($V_c$) where ϕ is any function that can simply be the identity function such that H(M)=$V_c$.

The calculation means can include definition means 13 and application means 15.

During an initialization phase, the definition means 13 define an initialization input p-tuple $E_0$=($e_{01}$, ..., $e_{0p}$) in the finite field F. The application means 15 then apply the initialization input p-tuple $E_0$ and the first data m-tuple M1 to said at least one set of multivariate polynomials Π to calculate a first output p-tuple $V_1$ corresponding to the first data m-tuple M1.

Then on each new current iteration number i the definition means 13 define in the finite field F a current input p-tuple $E_i$=($e_{i1}$, ..., $e_{ip}$).

The initial or current input p-tuple $E_i$=($e_{i1}$, ..., $e_{ip}$) can be a subset of a data m-tuple Mi. Also, the current input p-tuple $E_i$=($e_{i1}$, ..., $e_{ip}$) can be defined as a function of one or more of the output p-tuples $V_i$, ..., $V_{i-1}$ calculated in preceding iterations by the application means 15, i.e. $E_i$=f($V_1$, ..., $V_{i-1}$).

The current input p-tuple $E_i$=($e_{i1}$, ..., $e_{ip}$) is advantageously a function only of the output p-tuple $V_{i-1}$ calculated in the preceding iteration, i.e. $E_i$=f($V_{1-1}$) or explicitly ($e_{i1}$, ..., $e_{ip}$)=f($V_{i-1,1}$, ..., $V_{i-1,p}$).

The application means 15 apply the current input p-tuple $E_i$ and a current data m-tuple Mi to said at least one set of multivariate polynomials Π to calculate a current output p-tuple $V_i$ corresponding to the current data m-tuple Mi.

Thus the general cryptographic hashing process can be modeled as follows:

$$V_0=E_0, V_i=\Pi(f(V_{i-1}), Mi) \text{ for } 1\leq i\leq c \text{ and } H(M)=\phi(V_c).$$

To facilitate the calculation, the current input p-tuple $E_i$=($e_{i1}$, ..., $e_{ip}$) can advantageously correspond to a chaining p-tuple defined as being equal to the preceding output p-tuple $V_{i-1}$ calculated in the preceding iteration. Thus the calculation means 15 can calculate successive values $V_i$ of the chaining p-tuple by iteratively applying the m-tuple Mi with the preceding value $V_{i-1}$ of the chaining p-tuple to said at least one set of multivariate polynomials Π to determine the hashing value H(M) of the message M as follows:

$$V_0=E_0, V_i=\Pi(V_{i-1}, Mi) \text{ for } 1\leq i\leq c \text{ and } H(M)=\phi(V_c).$$

To increase security, the definition means 13 can modify said at least one set of multivariate polynomials Π in each iteration i as a function of the current input p-tuple $E_i$=($e_{i1}$, ..., $e_{ip}$). Thus the set of multivariate polynomials Π can be generated dynamically using a mechanism specified by f($V_{i-1}$).

Figure 2:
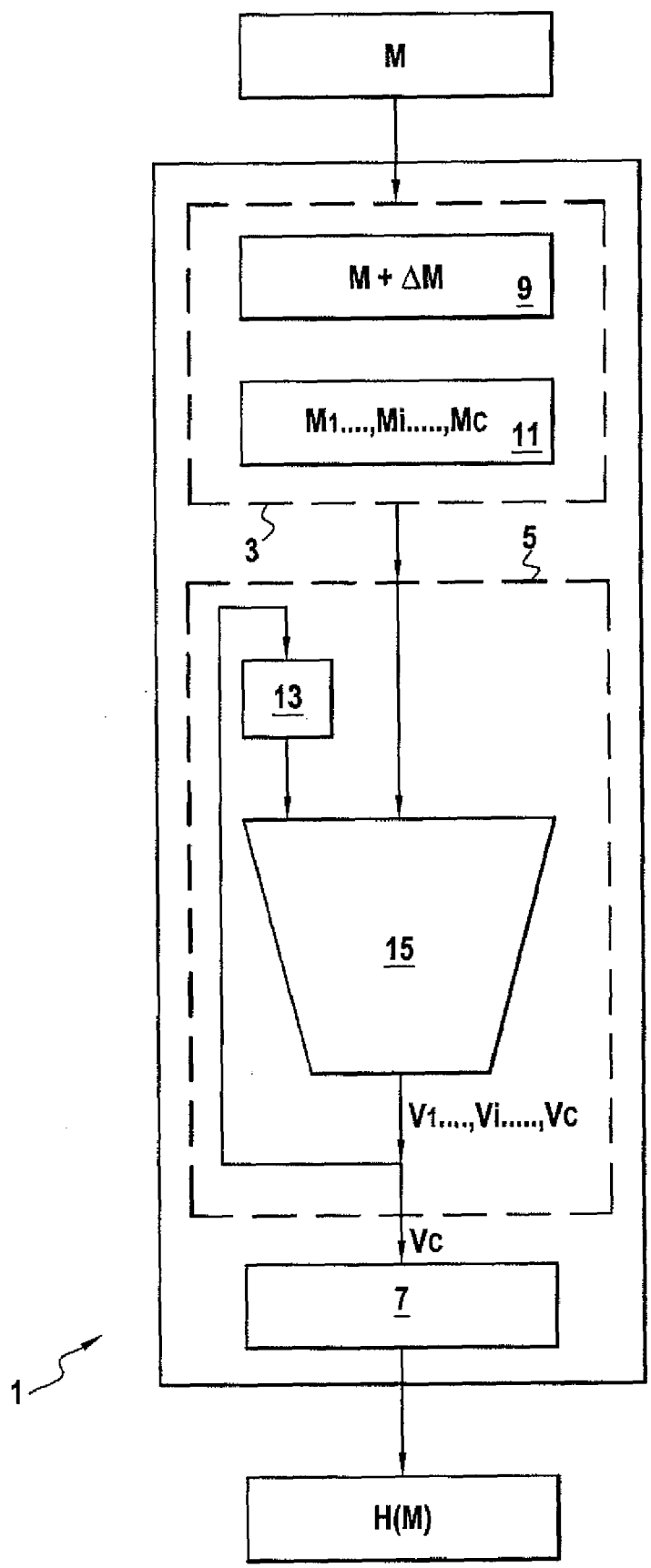
FIGS. 2 to 4 are examples of particular embodiments of FIG. 1.
Figure 3:
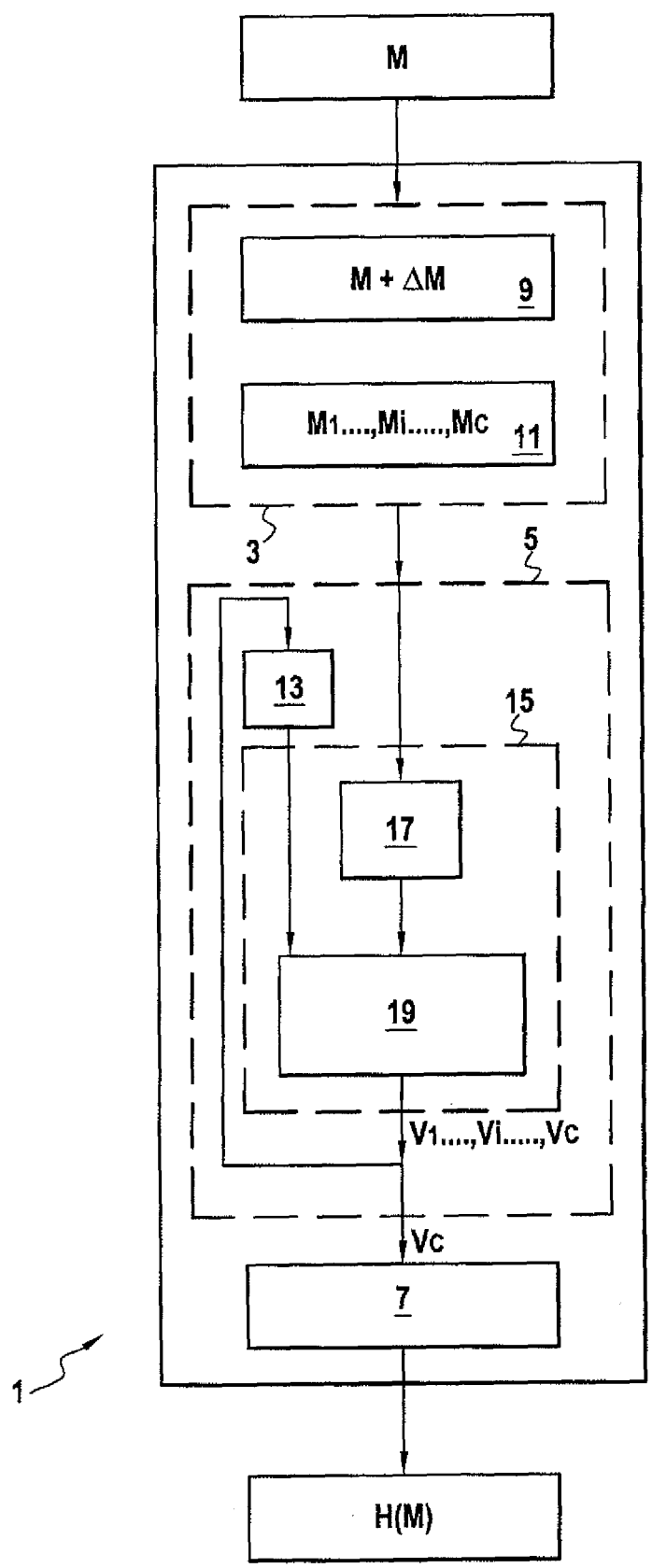
Figure 4:
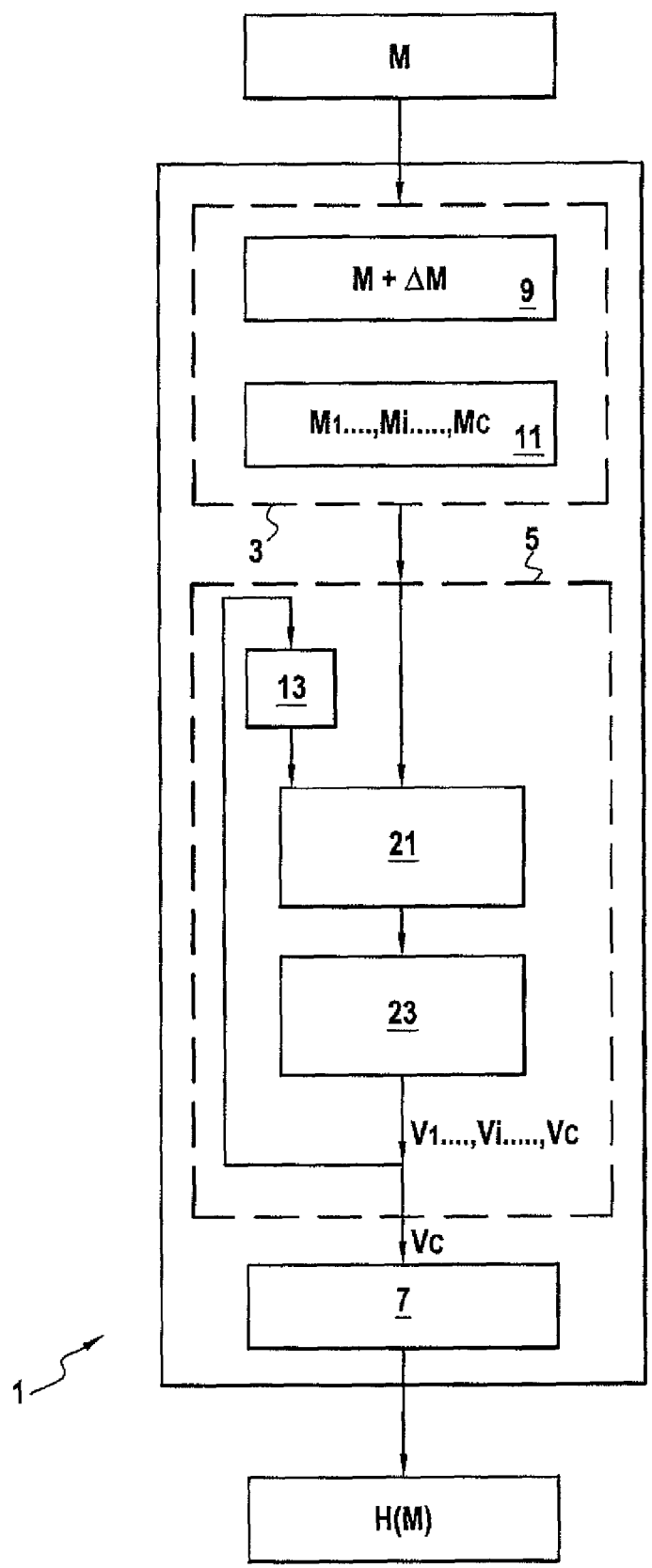

FIGS. 2 to 4 show embodiments of a cryptographic hashing device that differs from the FIG. 1 device only in the application means in relation to said at least one set of multivariate polynomials Π.

FIG. 2 shows a particular embodiment of the cryptographic hashing device 1 that differs from the FIG. 1 device in that said at least one set of multivariate polynomials Π consists of a single set of multivariate polynomials. This set of multivariate polynomials is of compressive form. The expression "multivariate polynomials of compressive form" refers to a set of multivariate polynomials including a number of polynomials less than the number of variables associated with each polynomial. The set of multivariate polynomials denoted $\Pi_{(p,k)}$ then includes a set of p polynomials $P_1(x_1, ..., x_k)$, ..., $P_p(x_1, ..., x_k)$, of degree 3 or 4, and each having k variables where p<k.

Thus the application means 15 calculate an output p-tuple $V_i$ corresponding to a data m-tuple Mi by simultaneously applying the data m-tuple and the corresponding input p-tuple $E_i$ to the set of multivariate polynomials $\Pi_{(p,k)}$.

In other words, the application means 15 form a k-tuple ($a_{i1}$, ..., $a_{im}$, $e_{i1}$, ..., $e_{ip}$) where k=m+p by concatenating an input p-tuple with said data m-tuple Mi so that the output p-tuple $V_i$ is calculated by a polynomial evaluation of the set of multivariate polynomials $\Pi_{(p,k)}$ in the following manner:

$$\Pi_{(p,k)}(a_{i1}, ..., a_{im}, e_{i1}, ..., e_{ip})=(v_{i1}, ..., v_{ip}).$$

For example, a multivariate polynomial in the four variables $x_1, x_2, x_3, x_4$ over the finite field GF(2) with exclusive-OR addition and Boolean multiplication between two bits can take the following form:

$$P(x_1, x_2, x_3, x_4)=x_1x_2+x_1x_3x_4+x_4+1.$$

FIG. 3 shows another embodiment of the cryptographic hashing device 1. The FIG. 3 device differs from the FIG. 1 device in that said at least one set of multivariate polynomials Π consists of two sets of multivariate polynomials:

$$\Pi^1_{(t,m)}=P^1_1(x_1, ..., x_m), ..., P^1_t(x_1, ..., x_m) \text{ and}$$

$$\Pi^2_{(p,k)}=P^2_1(x_1, ..., x_k), ..., P^2_p(x_1, ..., x_k).$$

In this example, the first set of multivariate polynomials $\Pi^1_{(t,m)}$ includes t polynomials with m variables and the second set of multivariate polynomials $\Pi^2_{(p,k)}$ includes p polynomials with k variables, and here k=t+p.

Thus to calculate the output p-tuple $V_i$ corresponding to the data m-tuple Mi, the application means 15 include first application means 17 and second application means 19.

The first application means 17 calculate an intermediate data t-tuple ($b_{i1}$, ..., $b_{it}$) by applying the data m-tuple Mi to the first set of multivariate polynomials $\Pi^1_{(t,m)}$ in the following manner:

$$\Pi^1_{(t,m)}(a_{i1}, ..., a_{im})=(b_{i1}, ..., b_{it}).$$

The second application means 19 simultaneously apply the intermediate data t-tuple $(b_{i1}, \ldots, b_{it})$ and the input p-tuple $E_i$ corresponding to the data m-tuple Mi to the second set of multivariate polynomials $\Pi^2_{(p,k)}$ to determine the output p-tuple $V_i$ as follows:

$$\Pi^2_{(p,k)}(b_{i1}, \ldots, b_{it}, e_{i1}, \ldots, e_{ip}) = (v_{i1}, \ldots, v_{ip}).$$

Of course, the second set of multivariate polynomials $\Pi_{(p,k)}$ is of compressive form, having a number p of polynomials smaller than the number k=t+p of variables associated with each polynomial.

The first set of multivariate polynomials $\Pi^1_{(t,m)}$ is advantageously of expansive form, i.e. includes a number t of polynomials greater than the number m of variables associated with each polynomial.

This is because the expansive form of the first set of multivariate polynomials $\Pi^1_{(t,m)}$ guarantees no collision during the first step and increases the resistance to collisions during the next compression step effected by the second set of multivariate polynomials $\Pi^2_{(p,k)}$.

FIG. 4 shows another embodiment of the cryptographic hashing device 1. The FIG. 4 device differs from the FIG. 1 device in that said at least one set of multivariate polynomials $\Pi$ consists of two sets of multivariate polynomials:

$$\Pi^1_{(t,m+p)} = P^1_1(x_1, \ldots, x_{m+p}), \ldots, P^1_t(x_1, \ldots, x_{m+p})$$
and $$\Pi^2_{(p,t)} = P^2_1(x_1, \ldots, x_t), \ldots, P^2_p(x_1, \ldots, x_t).$$

According to this example, the first set of multivariate polynomials $\Pi^1_{(t,m+p)}$ includes t polynomials with m+p variables and the second set of multivariate polynomials $\Pi^2_{(p,t)}$ includes p polynomials and t variables.

Thus, to calculate the output p-tuple $V_i$ corresponding to the data m-tuple Mi, the application means 15 include first application means 21 and second application means 23.

The first application means 21 calculate an intermediate data t-tuple $(b_{i1}, \ldots, b_{it})$ by simultaneously applying the data m-tuple and said corresponding input p-tuple $E_i$ to the first set of multivariate polynomials $\Pi^1_{(t,m+p)}$ as follows:

$$\Pi^1_{(t,m+p)}(a_{i1}, \ldots, a_{im}, e_{i1}, \ldots, e_{ip}) = (b_{i1}, \ldots, b_{it}).$$

The second application means 21 apply the intermediate data t-tuple to the second set of multivariate polynomials $\Pi^2_{(p,t)}$ to determine said output p-tuple $V_i$ as follows:

$$\Pi^2_{(p,t)}(b_{i1}, \ldots, b_{it}) = (v_{i1}, \ldots, v_{ip}).$$

The first set of multivariate polynomials $\Pi^1_{(t,m+p)}$ is advantageously of expansive form, including a number t of polynomials greater than the number m+p of variables associated with each polynomial. So, the second set of multivariate polynomials $\Pi^2_{(p,t)}$ is of compressive form, including a number p of polynomials smaller than the number t of variables associated with each polynomial.

Note that for the FIGS. 3 and 4 embodiments, the polynomials of the first and second sets of multivariate polynomials can be of any degree.

To facilitate the calculation, but still with a high security level, the polynomials of the first and second sets of multivariate polynomials can advantageously be of degree 2.

Figure 5:
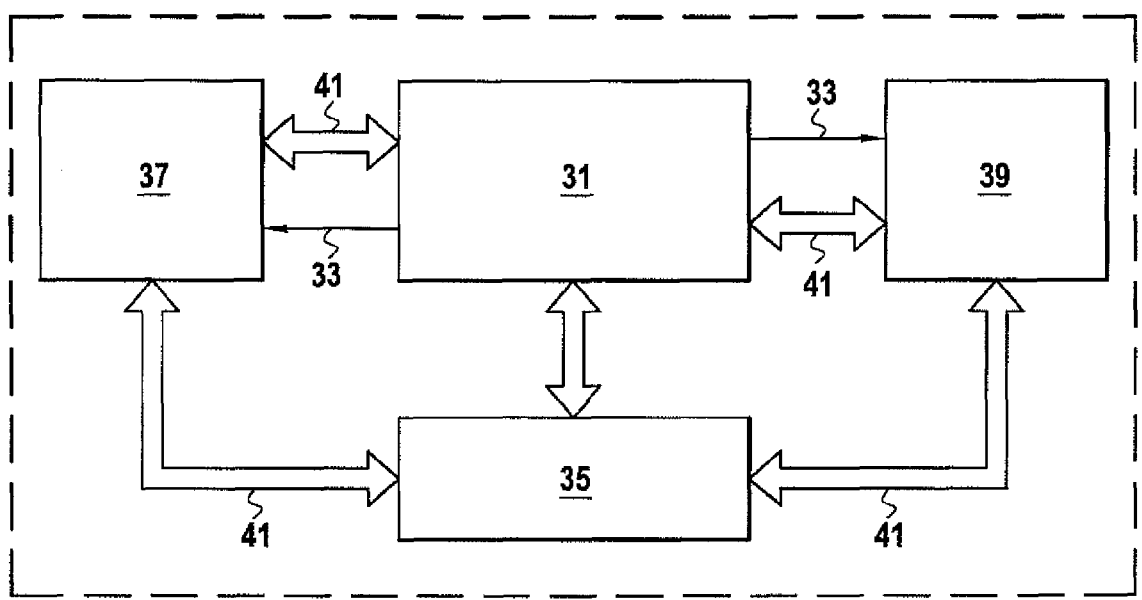
FIG. 5 shows very diagrammatically a data processing system using the cryptographic hashing device from FIGS. 1 to 4.

FIG. 5 shows very diagrammatically a data processing system (computer system) implementing the cryptographic hashing device 1 from FIGS. 1 to 4. This data processing system conventionally includes a central processor unit 31 controlling by means of signals 33 a memory 35, an input unit 37, and an output unit 39. All these elements are interconnected by data buses 41.

Moreover, this data processing system can be used to execute a computer program including instructions for implementing the cryptographic hashing method of the invention.

The invention is also directed to a computer program downloadable from a communications network and containing instructions for executing the steps of the cryptographic hashing method of the invention when it is executed in a computer. The computer program can be stored in a computer-readable medium and can be executable by a microprocessor.

This program can use any programming language, and take the form of source code, object code or an intermediate code between source code and object code, such as a partially compiled form, or in any other desirable form.

The invention is also directed to a computer-readable information medium containing instructions of the above computer program.

The information medium can be any entity or device capable of storing the program. For example, the medium can include storage means, such as a ROM, for example a CD ROM or a microelectronic circuit ROM, or magnetic storage means, for example a diskette (floppy disk) or a hard disk.

The information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit into which the program is incorporated, the circuit being adapted to execute the method in question or to be used in its execution.

The invention claimed is:

1. A method, executed by a processor, of cryptographically hashing a message M, comprising the steps of:
    forming, by the processor, a sequence (M1, ..., Mi, ..., Mc) of data m-tuples M1 $=(a_{1,1}, \ldots, a_{1,m}), \ldots,$ Mi $=(a_{i,1}, \ldots, a_{i,m}), \ldots,$ Mc $=a_{c,1}, \ldots, a_{c,m})$, where m is a strictly positive integer, from said message M;
    iteratively calculating, by the processor, successive output p-tuples $(V_1, \ldots, V_i, \ldots, V_c)$, where p is a strictly positive integer, corresponding to said sequence (M1, ..., Mi, ..., Mc) of data m-tuples as a function of at least one set of multivariate polynomials defined over a finite field, said iterative calculation of the successive output p-tuples $(V_1, \ldots, V_i, \ldots V_c)$ including the steps of:
    defining, by the processor, an initialization input p-tuple $E_0 = (e_{01}, \ldots, e_{0p})$ in the finite field;
    applying, by the processor, said initialization input p-tuple $E_0$ and a first data m-tuple M1 to said at least one set of multivariate polynomials to calculate a first output p-tuple $V_1$ corresponding to said first data m-tuple M1;
    in each new current iteration i, defining a current input p-tuple $E_i = (e_{i1}, \ldots, e_{ip})$ in the finite field that is a function at least of one of the output p-tuples $(V_1, \ldots, V_{i-1})$ calculated in the preceding iterations, and applying said current input p-tuple $E_i$ and a current data m-tuple Mi to said at least one set of multivariate polynomials to calculate a current output p-tuple $V_i$ corresponding to said current data m-tuple Mi; and
    determining, by the processor, a hashing value of said message M as a function of the last output p-tuple $V_c$.

2. The method according to claim 1, wherein the current input p-tuple $E_i = (e_{i1}, \ldots, e_{ip})$ corresponds to a chaining p-tuple defined as being equal to the preceding output p-tuple $V_{i-1}$ calculated in the preceding iteration.

3. The method according to claim 1, wherein said at least one set of multivariate polynomials is modified in each iteration i as a function of said current input p-tuple $E_i=(e_{i1}, \ldots, e_{ip})$.

4. The method according to claim 1, wherein the calculation of said output p-tuple $V_i$ corresponding to said data m-tuple Mi includes simultaneous application of said data m-tuple and the corresponding input p-tuple $E_i$ to only one set of multivariate polynomials, said set of multivariate polynomials being of compressive form.

5. The method according to claim 1, wherein the calculation of said output p-tuple $V_i$ corresponding to said data m-tuple Mi includes the steps of:

calculating an intermediate data t-tuple by applying said data m-tuple Mi to a first set of multivariate polynomials; and simultaneously applying said intermediate data t-tuple and the input p-tuple $E_i$ corresponding to said data m-tuple Mi to a second set of multivariate polynomials to determine said output p-tuple $V_i$.

6. The method according to claim 1, wherein the calculation of said output p-tuple corresponding to said data m-tuple Mi includes the steps of:

calculating an intermediate data t-tuple by simultaneously applying said data m-tuple and said corresponding input p-tuple $E_i$ to a first set of multivariate polynomials; and applying said intermediate data t-tuple to a second set of multivariate polynomials to determine said output p-tuple $V_i$.

7. The method according to claim 5, wherein said first set of multivariate polynomials is of expansive form and said second set of multivariate polynomials is of compressive form.

8. A device for cryptographically hashing a message M, comprising:

a formation unit which forms a sequence (M1, ..., Mi, ..., Mc) of data m-tuples $M1=(a_{1,1}, \ldots, a_{1,m}), \ldots, Mi=(a_{i,1}, \ldots, a_{i,m}), \ldots, Mc=(a_{c,1}, \ldots, a_{c,m})$, where m is a strictly positive integer, from said message M;

a calculation unit which iteratively calculates successive output p-tuples $V_1, \ldots, V_i, \ldots, V_c$, where p is a strictly positive integer, corresponding to said sequence (M1, ..., Mi, ..., Mc) of data m-tuples as a function of at least one set of multivariate polynomials defined over a finite field F, said calculation unit including:

a defining unit which defines an initialization input p-tuple $E_0=(e_{01}, \ldots, e_{0p})$ in the finite field F;

an applying unit which applies said initialization input p-tuple $E_0$ and a first data m-tuple M1 to said at least one set of multivariate polynomials to calculate a first output p-tuple $V_1$ corresponding to said first data m-tuple M1;

the defining unit defining, in each new current iteration i, a current input p-tuple $E_i=(e_{i1}, \ldots, e_{ip})$ in the finite field that is a function at least of one of the output p-tuples $(V_1, \ldots, V_{i-1})$ calculated in the preceding iterations;

the applying unit applying said current input p-tuple $E_i$ and a current data m-tuple Mi to said at least one set of multivariate polynomials to calculate a current output p-tuple $V_i$ corresponding to said current data m-tuple Mi; and a determination unit which determines a hashing value of said message M as a function of the last output p-tuple $V_c$.

9. A non-transitory computer readable medium which stores a computer program executable by a microprocessor, wherein the computer program comprises instructions for executing the steps of the cryptographic hashing method according to claim 1 when the computer program is executed in a computer.

* * * * *